C. H. DOOLEY.
WIRE REELING AND UNREELING MACHINE.
APPLICATION FILED FEB. 2, 1911.
1,138,940.
Patented May 11, 1915.
3 SHEETS—SHEET 3.
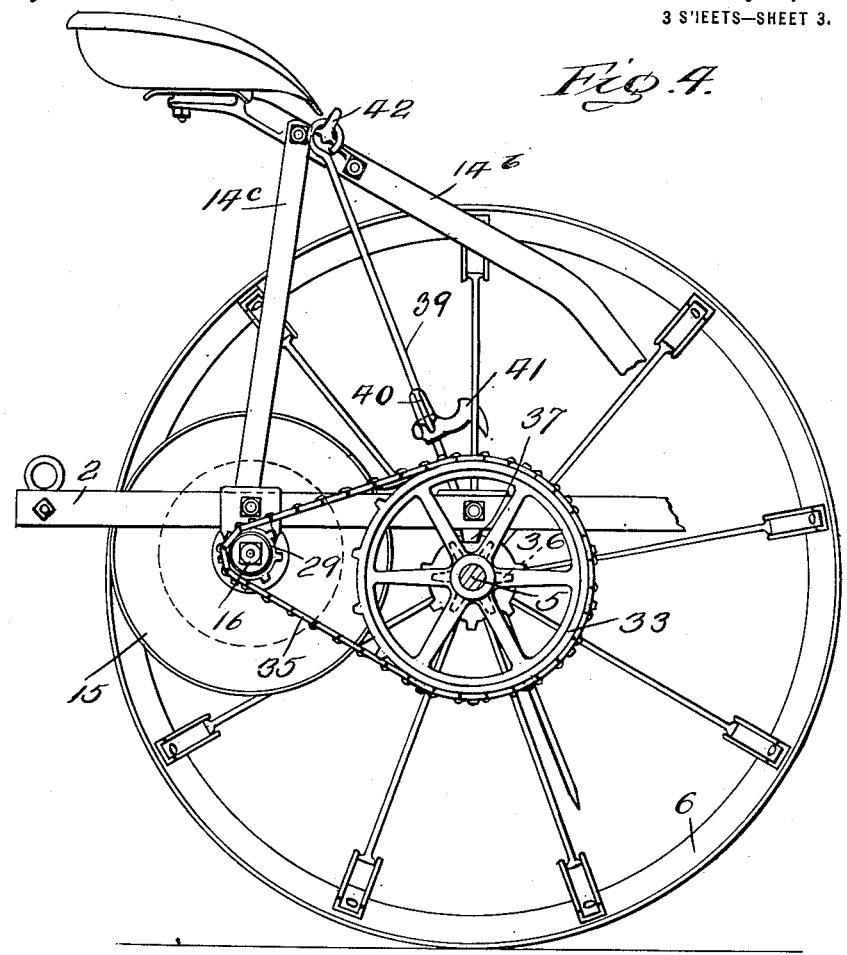
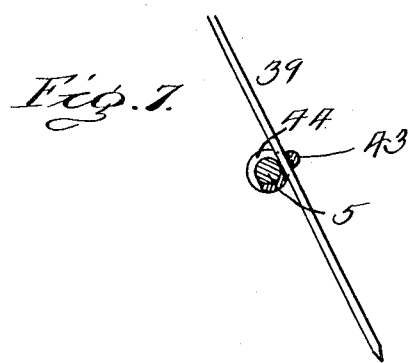
Witnesses
B. G. Brown
S. Jay Teller
Inventor
Clarence H. Dooley
By H. H. Bliss
Attorney

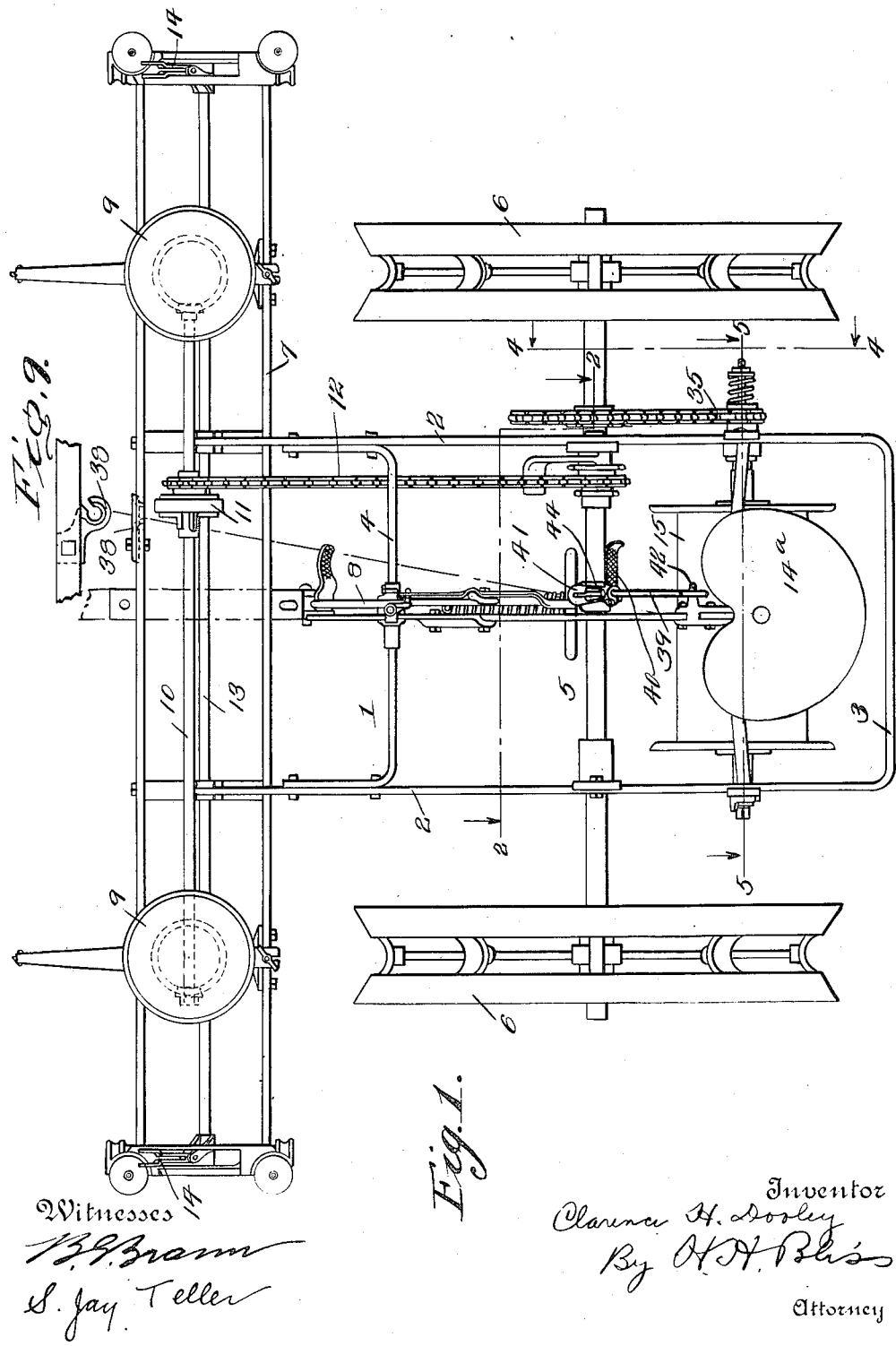

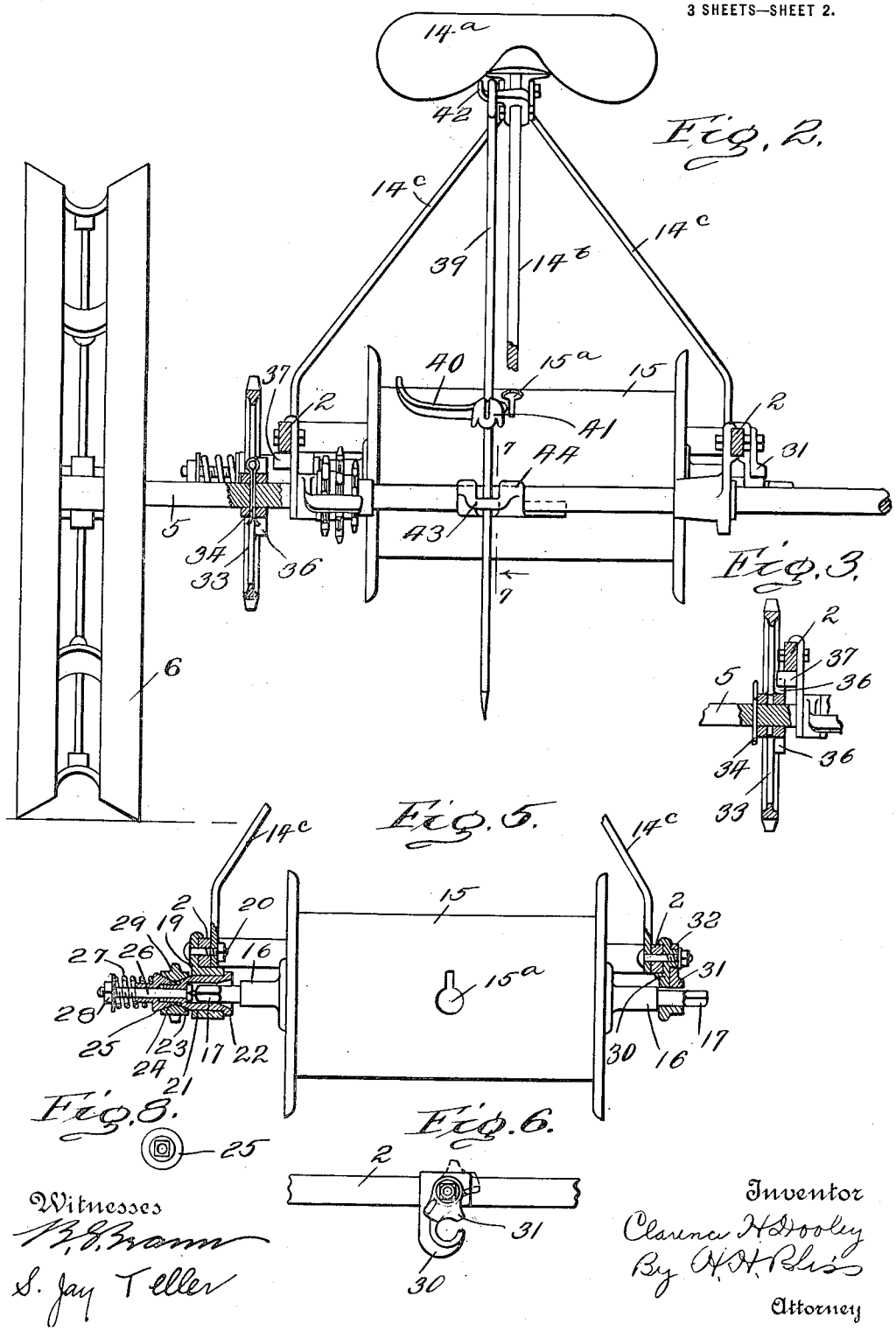

UNITED STATES PATENT OFFICE.

CLARENCE H. DOOLEY, OF ROCK ISLAND, ILLINOIS, ASSIGNOR TO DEERE & MANSUR CO., A CORPORATION OF ILLINOIS.

WIRE REELING AND UNREELING MACHINE.

1,138,940.      Specification of Letters Patent.      Patented May 11, 1915.

Application filed February 2, 1911. Serial No. 606,168.

*To all whom it may concern:*

Be it known that I, CLARENCE H. DOOLEY, a citizen of the United States, residing at Rock Island, in the county of Rock Island and State of Illinois, have invented certain new and useful Improvements in Wire Reeling and Unreeling Machines, of which the following is a specification, reference being had therein to the accompanying drawings.

The object of my invention is to provide a reel for winding and unwinding wire having improved driving means, and also to provide improved means for guiding the wire onto the reel.

In the accompanying drawings I have illustrated a corn planter which, so far as its general characteristics are concerned, may be considered as of any usual or preferred type. I have shown attached to this planter the reel mechanism and associated devices which constitute my present invention.

Referring to the drawings—Figure 1 is a plan view of the planter embodying my improvements; Fig. 2 is a partial cross sectional elevation taken along the line 2—2 of Fig. 1; Fig. 3 is a fragmentary cross sectional view similar to Fig. 2, but showing some of the parts in different positions; Fig. 4 is a fragmentary cross sectional view taken along the line 4—4 of Fig. 1; Fig. 5 is a fragmentary cross sectional view taken along the line 5—5 of Fig. 1; Fig. 6 is a detail view of the bearing for one end of the reel; Fig. 7 is a detail view taken along the line 7—7 of Fig. 2; Fig. 8 is a detail end view of one of the elements of the clutch; Fig. 9 is a detail view of the wire guiding eye.

Referring to the drawings, 1 represents as a whole the main frame of a planter. This comprises the two side bars 2, 2, the rear cross bar 3, and the forward cross bar 4.

5 is the main axle which is rotatable in suitable bearings secured to the side bars 2, 2.

6, 6, are the main supporting and driving wheels on which the axle 5 is mounted.

7 represents as a whole the forward frame of the machine which is pivotally connected with the forward ends of the side cross bars 2, 2. A suitable lever system 8 is provided for adjusting the relative positions of the two frames. The forward frame carries the seed planting mechanisms represented in the drawings by 9, 9. These seed mechanisms are operated by means of the shaft, 10, which is driven through the clutch 11, by means of the chain 12, and the main axle 5.

13 represents the rock shaft which carries at its ends the check wire forks 14, 14, adapted to be engaged by a check row wire. When the forks are actuated by the wire the clutch 11 is thrown into operative position by means of suitable devices connected to the rock shaft 13, and the seed mechanisms are moved to deposit a definite number of seeds.

14$^a$ represents the driver's seat which is supported by the bar 14$^b$ and the two braces 14$^c$, 14$^c$.

The parts which I have heretofore mentioned are well known in the art and their mode of operation is well understood. Further and more detailed description of them will not, therefore, be necessary.

15 represents the reel or drum upon which the check wire may be wound. This reel is provided with axial trunnions 16, 16, which preferably have squared ends, as indicated at 17, 17.

18 represents as a whole the supporting and driving mechanisms for one of the trunnions 16 of the reel. This mechanism 18 comprises a bracket or eye 19 which is secured to the side bar 2, preferably by means of a bolt 20.

21 is a bushing or sleeve rotatably mounted within the eye 19. This bushing 21 is provided at its inner end with a collar 22, and at its outer end with a conical surface 23 and an apertured square extension 24. The aperture within the main part of the bushing 21 is made square to engage with the square end 17 of the trunnion 16 to rotate it.

25 is a rotatable element with a conical surface opposite to that of the sleeve 21. This element 25 has a large square aperture, as indicated in Fig. 8, for the reception of the square extension 24 of the sleeve 21, and also has a small aperture through which extends a bolt 26. The bolt 26 extends through the small aperture in the sleeve 21 and also through a similar aperture in the element 25. This bolt has its headed end within the large aperture of the bushing. A coil spring 27 is provided which engages at its inner end with the element 25. The outer end of the spring engages with a washer which is held in place by means of a nut 28 which engages the threaded end of the bolt 26.

29 is a clutch element provided with sprocket teeth and having inner conical surfaces adapted to engage with the conical surfaces of the bushing 21 and the element 25. It will be apparent that by suitably adjusting the spring 27 by means of the nut 28, the element 25 may be thrust inward with sufficient force to cause any desired degree of friction between the sprocket element 29, and the other elements 21 and 25. The other end of the reel 15 is supported in a hook-like bearing 30, which is secured to the side bar 2.

31 is a latch or dog which is pivotally mounted on a hub 32 on the hook 30. This latch serves when in operative position, as indicated in Fig. 6, to prevent movement of the trunnion out of the hook. In Fig. 6, I have also indicated by dotted lines the position which the latch can take to permit removal of the trunnion.

Referring more especially to Figs. 2 and 3, 33 represents a sprocket wheel rotatable on the main axle 5. This sprocket wheel may be secured to the axle, however, by means of a cotter pin 34 extending through suitable apertures in the wheel hub and in the axle. 35 is a chain connecting the sprocket wheel 33 with the sprocket element 29. A series of lugs 36 is provided on the sprocket wheel 33, these lugs being equally spaced. 37 is a stop formed preferably on the casting for one of the main bearings. By removing the cotter pin 34 the sprocket 33 may be moved longitudinally on the axle to bring the lugs 36 into engagement with the stop 37, rotation of the sprocket wheel being thus prevented. In Fig. 3 I have shown the sprocket wheel in this position. It will be observed that the cotter pin 34 may be again inserted in the aperture through the axle to maintain the sprocket wheel in position to engage the stop. 38 is an eye attached to the front frame of the machine and serving to guide the check row wire onto the reel. This eye is provided with a slot which permits ready insertion or removal of the wire. It will be observed that this eye is located at one side of the center of the machine and in substantial alinement with one end of the reel. 39 represents an anchor pin which is adapted to be used for securing one end of the wire in place while it is being used. This pin is provided with an eye at its upper end, and between its ends there is provided a foot rest 40, and also a wire engaging eye 41. Preferably the foot rest 40 and the eye 41 are formed of one casting which is clamped to the pin as indicated in the drawings. A hook 42 is provided on the seat supporting casting, this hook being adapted to receive the eye at the upper end of the pin 39. When the pin is thus engaged with the hook, the foot rest 40 will be in position to be engaged by the operator's foot. The lower end of the pin 39 extends through an eye 43 of a bushing 44 which is slidably mounted upon the axle 5. This bushing serves to guide the lower end of the pin and to limit its transverse swinging movement.

In operation, let it be supposed that the check wire is already wound upon the reel and that the operator has arrived with the machine at the field which is to be planted. He first secures one end of the check row wire to the ground by means of an anchor pin which may be the pin 39 illustrated in the drawings or another one similar to it. It will be assumed that the sprocket wheel 33 is in locked position as shown in Fig. 3. The reel can therefore rotate only against the friction of the clutch 18. The operator drives across the field and the check wire unwinds from the reel, the resistance of the clutch serving to maintain the wire under tension. As soon as the wire has been unwound from the reel in this way the normal operations of check row planting may be taken up and carried out in the well known manner. When the check row wire is to be wound preparatory to leaving the field, the sprocket wheel 33 is moved to the position shown in Fig. 2, and secured to the axle. The wire is inserted in the eye 38 and its end is secured to the drum preferably by means of the slot 15ª. The pin 39 is put in place and extends through the eye 43 as indicated in the drawings. Care is taken that the wire passes the pin on the left hand side. The operator then drives across the field in the direction of the extended wire. The gearing between the axle and the reel is such that the tendency of the reel is to wind the wire at a rate faster than the speed of the machine. This tendency is counteracted by slippage of the clutch elements, the result being that the wire is maintained continually under tension. On account of the location of the eye 38 at the right hand side of the center of the machine, the tendency of the wire is to work toward the right hand side of the reel as it winds upon it. As soon as the wire reaches the right hand side of the reel, the driver with his foot moves the pin 39 slowly toward the left hand end of the machine, thus slowly forcing the wire toward the left hand end of the reel as it continues to wind upon it. As soon as the wire reaches the left hand end of the reel, the driver swings the pin back toward the right and the wire works toward the right hand end of the reel as before on account of the location of the eye 38. This operation comprising the automatic winding of the wire toward the right hand end of the reel, and the pin controlled winding toward the left hand end of the reel is repeated indefinitely, until all of the wire has been wound. If it is desired to remove the reel either when it is empty or when it carries the wire, this may be done at any time by moving the latch 31 and moving the reel backward and transversely out of engagement with the hook 30 and the bushing 21.

What I claim is:—

1. The combination of a main frame, supporting and driving wheels therefor, a reel for a wire, power connections between one wheel and the reel, an eye secured to the frame at a point directly in advance of one end of the reel, and means within the control of the operator for causing the wire as it is wound upon the reel to work toward the end of the reel opposite to the eye, the wire returning to the other end automatically.

2. The combination of a frame, supporting and driving wheels for the frame, a reel upon which a wire may be wound, the said reel being mounted upon the frame, power connections between one of the said wheels and the reel, a wire guiding eye located substantially directly in advance of one end of the reel, an element adapted to serve as an anchor pin for the end of the said wire, the said element having an eye at one end and a foot rest intermediate its ends and a hook on the frame adapted to support the said element by means of the eye thereof in position to permit the operator to swing the said element by means of the foot rest thereof to guide the wire as it is wound upon the reel toward that end of the reel which is opposite to the said eye on the frame, the wire returning to the other end of the reel under the influence of the eye.

3. The combination of a main frame, supporting and driving wheels therefor, a reel for a wire mounted upon the frame, power connection between one of the wheels and the reel, a wire guiding eye on the frame, substantially directly in advance of one end of the reel, and means for controlling the winding of the wire upon the reel comprising a rod movably connected at its upper end with the frame and a sleeve slidable on the main axle, the said rod serving to engage the wire to move it toward the end of the reel opposite to the said eye, the wire returning to the other end of the reel automatically under the influence of the eye.

4. The combination of a main frame, an axle, supporting and driving wheels upon which the axle is mounted, a reel rotatably connected with the axle, a wire guiding eye mounted upon the frame at a point substantially directly in advance of one end of the reel, and a wire guiding mechanism comprising a rod pivotally connected at its upper end with the main frame and a sleeve slidable on the axle and provided with an eye through which the lower end of the rod passes loosely, the said rod serving when moved by the operator to move the wire as it winds upon the reel toward the end thereof which is opposite to the said eye on the frame, the wire returning automatically to the other end of the reel as it continues to wind.

5. The combination of a main frame, a rotatable axle supporting the frame, supporting and driving wheels for the axle, a wire reel, a sprocket wheel connected with the reel, a second sprocket wheel mounted upon the axle, a chain connecting the two sprocket wheels, a lug on the main frame, in position to engage the sprocket wheel on the axle, the said sprocket wheel being slidable on the axle into or out of engagement with the lug, and means for locking the said sprocket wheel to the axle when out of engagement with the lug.

6. The combination of a main frame, a rotatable axle supporting the frame, supporting and driving wheels for the axle, a wire reel, axial trunnions for the reel, power transmitting mechanism interposed between the axle and the reel, the said mechanism engaging and detachably supporting the reel at one end by means of one trunnion, and means for detachably supporting the reel at the other end by means of the other trunnion, the said means comprising a trunnion engaging bearing open at one side and a movable latch adapted to engage the trunnion and hold it in engagement with the bearing and arranged to move automatically into operative position.

In testimony whereof I affix my signature, in presence of two witnesses.

CLARENCE H. DOOLEY.

Witnesses:
 OSCAR F. LUNDAHL,
 ROBERT M. ADAMS.